C. AMBRUSTER.
SUPPORT FOR STORAGE BATTERY INSULATORS.
APPLICATION FILED APR. 5, 1913.

1,181,362.

Patented May 2, 1916.

WITNESSES:

INVENTOR
Cornelius Ambruster
BY
Augustus B. Stoughton
ATTORNEY.

UNITED STATES PATENT OFFICE.

CORNELIUS AMBRUSTER, OF PHILADELPHIA, PENNSYLVANIA.

SUPPORT FOR STORAGE-BATTERY INSULATORS.

1,181,362. Specification of Letters Patent. Patented May 2, 1916.

Application filed April 5, 1913. Serial No. 759,046.

*To all whom it may concern:*

Be it known that I, CORNELIUS AMBRUSTER, a citizen of the United States, residing at the city of Philadelphia, in the county of Philadelphia and State of Pennsylvania, have invented a certain new and useful Support for Storage-Battery Insulators, of which the following is a specification.

Storage battery tanks are usually supported upon insulators placed under them and these insulators in turn require supports placed under them, and it is to the last named supports that the present invention relates.

The principal object of the present invention is to provide a strong insulator support that can be successfully made without fire cracks and of material which will resist acid and also withstand considerable changes of temperature, and to provide such a support that will be firm and stable, not likely to chip or crack in use, and of comparatively light weight so as to be economical in the use of material and light in shipment where freight charges are an item.

The invention will be claimed at the end hereof but will be first described in connection with the embodiment of it chosen for illustration in the accompanying drawings in which—

Figures 1, 2:
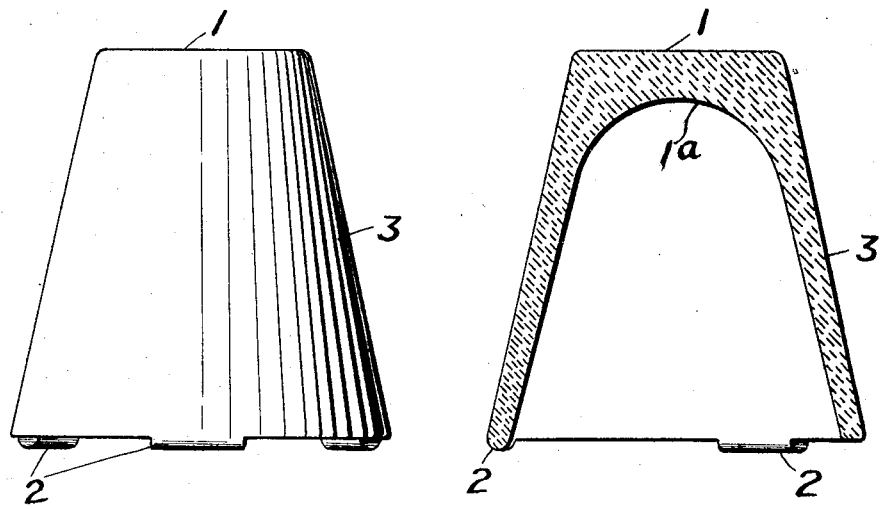
Figure 3:
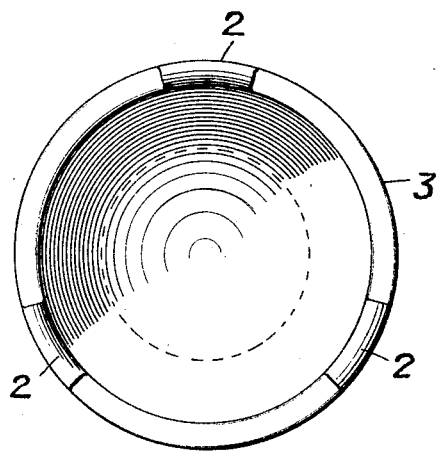

Figure 1, is a side view of an insulator support embodying features of the invention. Fig. 2, is a transverse sectional view of the same, and Fig. 3, is a bottom plan view of the same.

An insulator support embodying features of the invention is made of earthenware which resists the action of acid and can be produced by annealing or otherwise in such condition that it will withstand sudden changes of temperature, for example, cold water used in washing the floor will not crack the insulator support. The insulator of earthenware comprises a hollow body of the form of a conic frustum. The hollow form insures a saving of material and also of weight and permits of the manufacture of the insulator support free from fire cracks. At the smaller end of the hollow body there is externally a flat supporting surface 1, and internally there is a dome-like surface 1ª, which imparts great strength with little material; and at the other end there is a rim provided with projecting feet 2, having rounded surfaces. The rounded surface of the feet resting upon the floor distributes the strain centrally of the earthenware wall 3, so that the latter is not likely to chip off or split. There are three of these feet so that there is a three-point support which gives stability even upon an uneven floor or surface. The surface 1, is flat and upon it the insulator proper is supported.

What I claim as new and desire to secure by Letters Patent is:

1. An earthenware insulator support for storage batteries comprising a hollow body of the form of a conic frustum having at its smaller end a flat supporting surface and at its larger end a rim provided with feet projecting in the direction of the wall of the body, substantially as described.

2. An earthenware insulator support for storage batteries comprising a hollow body of the form of a conic frustum having at its smaller end an externally flat supporting surface and an internally domed reinforcing portion and at its larger end a rim provided with feet projecting in the direction of the wall of the body, substantially as described.

In testimony whereof I have hereunto signed my name in the presence of two witnesses.

CORNELIUS AMBRUSTER.

Witnesses:
CLIFFORD K. CASSEL,
FRANK E. FRENCH.

Copies of this patent may be obtained for five cents each, by addressing the "Commissioner of Patents, Washington, D. C."